United States Patent [19]
Hashimoto

[11] Patent Number: 5,168,016
[45] Date of Patent: Dec. 1, 1992

[54] ZINC-HALOGEN SECONDARY BATTERY WITH FEATURE OF ENHANCED CHARGE EFFICIENCY

[75] Inventor: Takafumi Hashimoto, Tokyo, Japan

[73] Assignee: Kabushiki Kaisha Meidensha, Japan

[21] Appl. No.: 630,167

[22] Filed: Dec. 19, 1990

[30] Foreign Application Priority Data

Dec. 21, 1989 [JP] Japan .............................. 1-147238[U]

[51] Int. Cl.[5] .............................................. H01M 4/00
[52] U.S. Cl. ........................................ 429/27; 429/53; 429/50; 429/82; 429/86
[58] Field of Search ....................... 429/27, 53, 50, 82, 429/86

[56] References Cited

U.S. PATENT DOCUMENTS 4,369,235  1/1983  Bursell .................................. 429/27

OTHER PUBLICATIONS

Patent Abstracts of Japan, vol. 13, No. 68 (E-716)[3417], Feb. 16, 1989; JP-A-63 252 366 (Furukawa Electric Co., Ltd.), Oct. 19, 1988.
Patent Abstracts of Japan, vol. 13, No. 160 (E-744) [3508], Apr. 18, 1989, JP-A-63 314 782 (Furukawa Electric Co., Ltd.), Dec. 22, 1988.

Primary Examiner—Karl Group
Assistant Examiner—Deborah Jones
Attorney, Agent, or Firm—Ronald P. Kananen

[57] ABSTRACT

A zinc-halogen secondary battery has a filter filled with zinc particles and is disposed with a manifold for filling with an electrolyte. The filter is connected to an exhaust pump. The exhaust pump is operated for removing bubbles in respective cells of the battery before charging.

7 Claims, 2 Drawing Sheets

ZINC-HALOGEN SECONDARY BATTERY WITH FEATURE OF ENHANCED CHARGE EFFICIENCY

BACKGROUND OF THE INVENTION

1. Field of the Invention

The present invention relates generally to a zinc-halogen secondary battery for accumulating electric power. More specifically, the invention relates to a zinc-halogen secondary battery which is provided with an enhanced charge efficiency by avoiding the attachment of bubbles to electrodes during charging.

2. Description of the Prior Art

In the recent years, there have been developed a number of cell-type electric-power accumulation systems. Various zinc-halogen batteries (e.g., zinc-bromine batteries, zinc-chloride batteries and so forth) have been developed for use in such power accumulation systems. In cases where such batteries are used for accumulating electric power, a large electric power storage capacity is available, generated by circulating electrolyte and an external active material. However, in some technologies, such as uninterruptible power sources, a large electric power accumulation capacity is not required. In such cases, a non-flow type or fluid-static type battery is useful.

In such a battery, one problem encountered is that bubbles are generated and attach to the cathode electrode surface while the battery is in operation. Bubbles are formed by air heated with the electrolyte or by direct reaction of bromine (redissolved from the anode electrode) with zinc (extracted from the cathode electrode) which generates hydrogen to form hydrogen bubbles. In the alternative, when the amount of zinc in the vicinity of the cathode electrode upon electrodeposition of zinc becomes less than or equal to 0.5 mol/l, the generation of hydrogen is rapidly increased, forming bubbles.

When charging is conducted while bubbles are present, zinc cannot be deposited on the cathode electrode at portions where bubbles are attached, thus the smoothness of the cathode electrode surface is degraded and dendritic crystals may also form which cause degradation of the battery efficiency.

The bubbles can be removed by circulating the electrolyte by means of a fluid pump. In such cases, however, a shuttle current will flow through the manifold to cause a degradation in the uniformity of electrodeposition of zinc at a plurality of the cells and heat may be generated. Therefore, the bubbles can be removed by generating a flow of the electrolyte only when the battery voltage is zero.

SUMMARY OF THE INVENTION

Therefore, it is an object of the present invention to provide a zinc-halogen secondary battery in which bubbles can successfully be removed from a negative electrode.

In order to accomplish the aforementioned and other objects, a zinc-halogen secondary battery, according to the present invention, has a filter filled with zinc particles and disposed in connection with a manifold for filling an electrolyte. The filter is connected to an exhaust pump. The exhaust pump is operated for removing bubbles in respective cells of the battery before charging.

According to one aspect of the invention, a zinc-halogen secondary battery comprises:

one or more core cells each having electrodes and defining a cathode chamber and an anode chamber separated by means of a separator;

a manifold provided in the battery and designed for filling electrolyte therethrough;

a filter connected to said manifold and designed for filtering a gaseous bromine component in an exhaust gas; and an exhaust pump for exhausting gas in the electrolyte in advance of the charging process.

In the preferred construction, the filter is filled with zinc particles.

According to another aspect of the invention, a method for removing gas in an electrolyte in a zinc-halogen secondary battery, comprises the steps of:

connecting a filter and an exhaust pump to a manifold in the battery, through which manifold, the electrolyte is filled; and driving said exhaust pump in advance of a charging process for removing gas from said electrolyte and for exhausting the gas through the filter for removing pollutants in the exhaust gas to be exhausted in said filter.

Preferably, the filter is filled with zinc particles.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
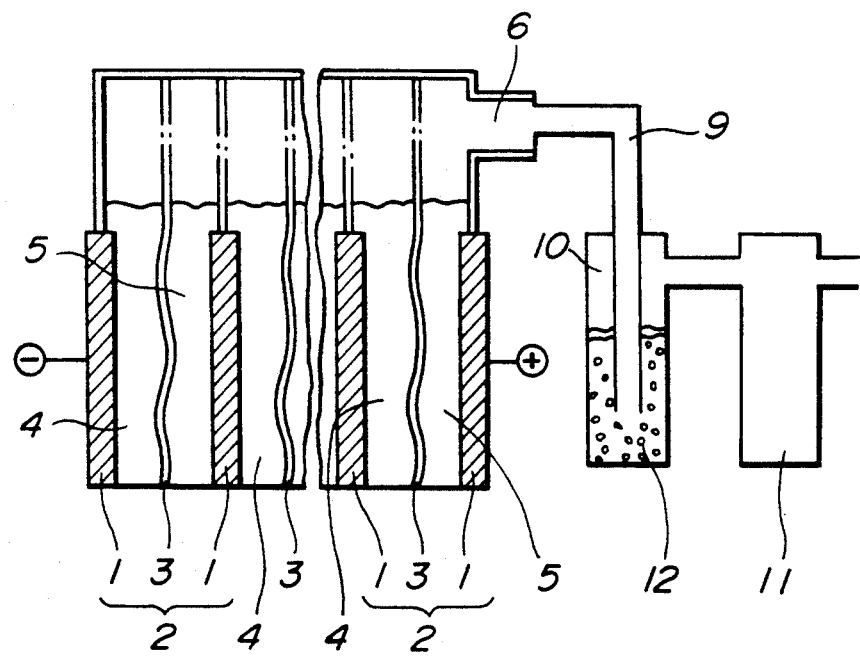
FIG. 1 is a fragmentary illustration of the preferred embodiment of a zinc-halogen secondary battery according to the present invention.

Referring now to the drawings, the preferred embodiment of a zinc-halogen secondary battery has a plurality of core cells 2. Each of the core cells 2 has an anode chamber 4 and a cathode chamber 5 separated from each other by means of a separator 3. A manifold 6 is formed for filling the core cells with electrolyte. Anode and cathode electrodes 1 are provided in the core cells 2.

In the embodiment shown in FIG. 1, a bipolar-type secondary battery is formed by piling ten core cells 2, each having electrodes 1 with a surface area of 800 cm$^2$.

A filter 10 is connected to the manifold 6 via piping 9. The filter 10 is connected to an exhaust pump 11. The filter 10 is filled with zinc particles 12. In the shown embodiment, the exhaust pump 11 employed has a vacuum capacity of 550 mmHg, an 18 l/min exhaust efficiency and 20 W of input.

Using the shown construction, the exhaust pump 11 was driven for 10 minutes before starting charging. During this process, bromine gas contained in the exhaust gas is capable of being removed by zinc in the filter 12. Therefore, bromine gas need never be discharged through the exhaust pump 11.

After removing bubbles by the foregoing process, charging was performed at 8A for 1 hour. Then, the charged power was discharged until the battery voltage was lowered to 10 V. This charge/discharge cycle was repeated for 6 cycles. After charging for the 7th cycle, the battery was dismantled and inspected. As a result of this inspection, no bubble traces nor dendritic formations were observed.

Figure 2:
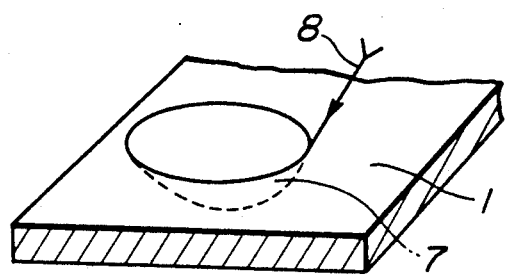
FIG. 2 is an enlarged partial perspective view of an electrode, which is illustrated to show the formation of a dendrite on the electrode due to the presence of bubbles.
Figure 3:
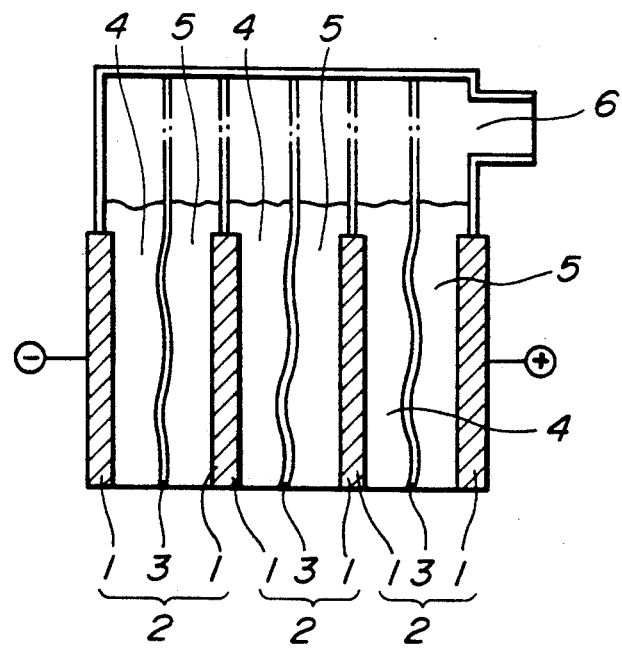
FIG. 3 is a fragmentary illustration of the zinc-halogen secondary battery of the prior art.

A comparative experiment was performed utilizing a battery assembly as illustrated in FIG. 3. As can be seen from FIG. 3, the example shown is differentiated from that in the preferred embodiment by the absence of the filter 10 and the exhaust pump 11. Utilizing this arrangement, the experiment was performed under the same operating conditions as those set forth above. Namely, charge/discharge cycles were repeated 6 times, and, after charging for the 7th cycle, the battery was dismantled and inspected. As a result of the inspection, bubble traces 7 and dendritic formations 8, as shown in FIG. 2, were formed.

From this, gas performance in the shown embodiment can be successfully proven.

While the present invention has been discussed in terms of the preferred embodiment of the invention, the invention can be implemented in various ways. Therefore, the invention should be understood to include all possible embodiments which can be implemented without departing from the principle of the invention.

What is claimed is:

1. A bipolar secondary battery, comprising:

at least one core cell having electrodes and defining a cathode chamber and an anode chamber separated by means of a separator;

a manifold communicating with said core cell for allowing circulation of electrolyte through said core cell, said manifold further including a connecting portion;

a filter having an input connected to said connecting portion of said manifold and an output, said filter containing means for removing a halogen component present in an exhaust gas from said core cell before said exhaust gas reaches an output of said filter; and a pump having a suction side connected to said output of said filter and an exhaust side oriented toward an ambient atmosphere.

2. A bipolar secondary battery as set forth in claim 1, wherein said filter contains zinc particles.

3. A bipolar secondary battery as set forth in claim 1, wherein said halogen component is gaseous bromine.

4. A zinc-bromine secondary battery comprising:

a core cell having electrodes and defining a cathode chamber and an anode chamber separated by means of a separator;

a manifold communicating with said core cell for allowing circulation of electrolyte through said core cell, said manifold further including a connecting portion;

a filter including a filter chamber and containing zinc particles for filtering out a gaseous bromine component in an exhaust gas from said core cell, said filter connected to said connecting portion of said manifold at an input portion thereof, for percolating exhaust gas from said electrolyte through said zinc particles; and an exhaust pump having a suction side connected to an output portion of said filter and an exhaust side oriented toward an ambient atmosphere for removing said exhaust gas in said filter chamber.

5. A method for prolonging and operating life of a bipolar secondary battery having at least one core cell, comprising repeating the steps of:

removing halogen gas from said core cell under vacuum when said battery is in a discharged state;

filtering said gas to remove halogen;

expelling filtered gas into a surrounding atmosphere;

charging said core cell of said battery;

discharging said core cell of said battery; and repeating said removing, filtering, expelling, charging, and discharging steps.

6. The method of claim 5, wherein said bipolar secondary battery is a zinc-bromine secondary battery.

7. The method of claim 6, wherein said filtering step comprises passing said bromine gas through zinc particles.

* * * * *